No. 781,498. Patented January 31, 1905.

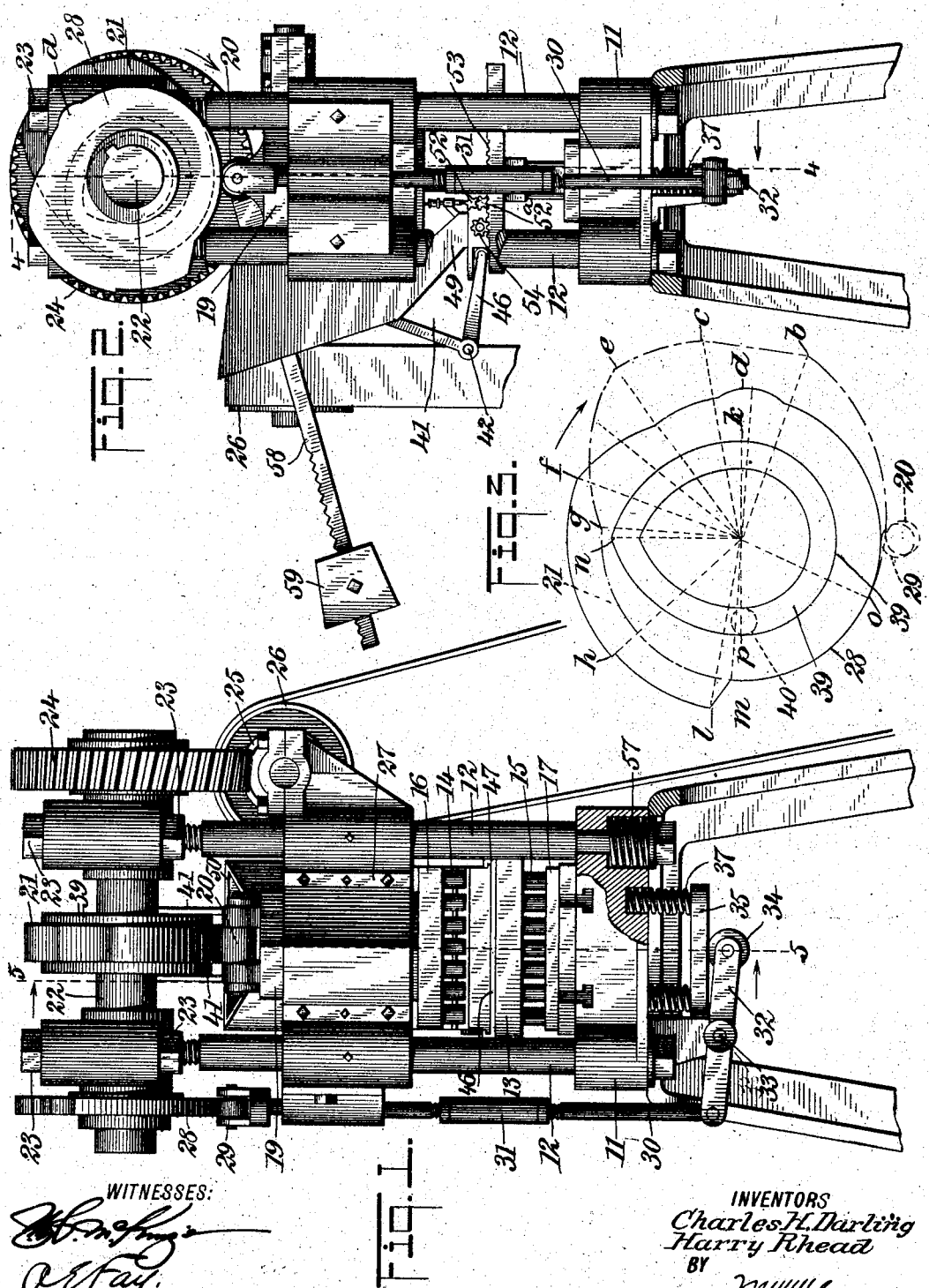

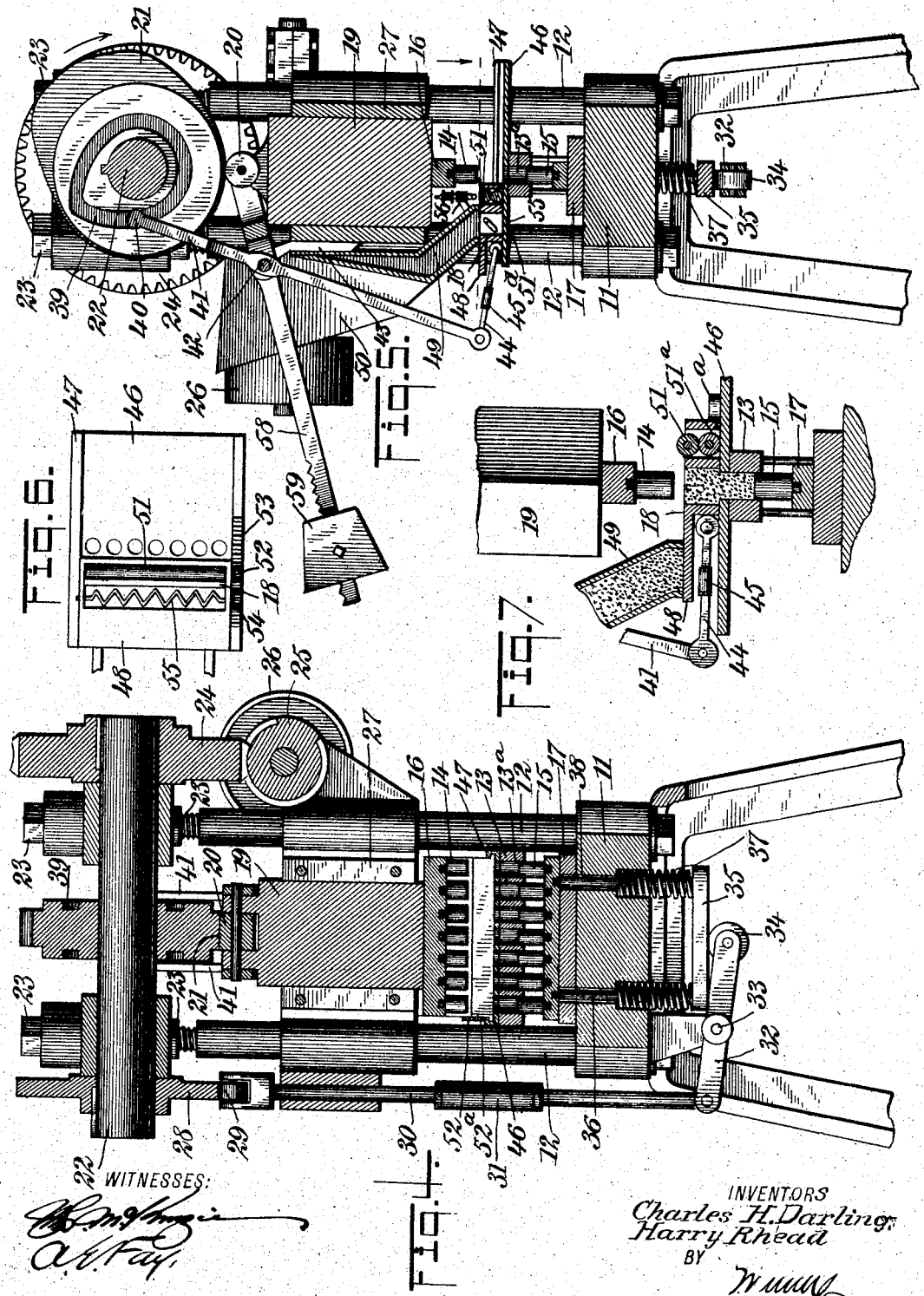

UNITED STATES PATENT OFFICE.

CHARLES HENRY DARLING AND HARRY RHEAD, OF TRENTON, NEW JERSEY.

MOLDING-PRESS.

SPECIFICATION forming part of Letters Patent No. 781,498, dated January 31, 1905.

Application filed April 22, 1904. Serial No. 204,391.

*To all whom it may concern:*

Be it known that we, CHARLES HENRY DARLING and HARRY RHEAD, citizens of the United States, and residents of Trenton, in the county of Mercer and State of New Jersey, have invented a new and Improved Molding-Press, of which the following is a full, clear, and exact description.

Our invention relates to a molding-press capable of use for molding all plastic substances, but especially applicable for the manufacture of tiles from clay.

The object of our invention is to provide a power-operated molding-press with means whereby the operations ordinarily performed in hand-presses may take place automatically and without the intervention of any manual control. The manner of attaining this object which we prefer to employ and which constitutes the principle of our invention will be further described, and the subsidiary objects will be disclosed in the subjoined description.

Reference is to be had to the accompanying drawings, forming a part of this specification, in which similar characters of reference indicate corresponding parts in all the figures.

Figure 1 is a side view of a preferred form of our invention. Fig. 2 is an end view of the same. Fig. 3 is a diagrammatic view illustrating the operation of the cams. Fig. 4 is a central sectional view on the line 4 4 of Fig. 2. Fig. 5 is a central sectional view on the line 5 5 of Fig. 1. Fig. 6 is a plan view of the feed-box and attachments, and Fig. 7 is a central sectional view showing the manner of filling the mold.

In the particular embodiment of our invention which is represented in the drawings the numeral 11 represents a base provided with standards 12, which support a mold-plate, 13, preferably in a stationary position. The mold-plate is provided with one or more perforations 13ª, each one serving as the main part of a mold. Although throughout this specification we shall designate these perforations as "molds," it is to be understood that each complete mold is formed by a perforation and the plungers 14 and 15, which enter its opposite ends. These two series of plungers are attached to and supported by a pair of plunger-plates 16 and 17.

18 is a feed-box adapted to move across the top of the mold and supply it with plastic material to be molded.

It will be obvious from the description so far given that the material to be molded is intended to be placed in the feed-box 18, passed over the top of the molds, and discharged therein and that the feed-box must then be withdrawn in order to permit the plunger 14 to enter the mold and compress the plastic material. The plunger 15, which normally constitutes the bottom of the mold, will of course be in position with its end within the mold proper when the material is deposited. After the material is molded and the plunger 14 withdrawn the plunger 15 is forced upwardly to discharge the molded object from the mold, and it remains in its uppermost position sufficiently long to hold the molded article *a* in position for the front part of the feed-box 18 to engage with it and push it along out of the way, as shown in Fig. 7. Mechanism for operating these parts will now be described.

19 is a slide to which is attached the plunger-plate 16 and which is provided at its upper end with a roller 20, adapted to be operated by means of a cam 21, fixed to a shaft 22. The shaft 22 is mounted in bearings of ordinary or any desired construction, which are adapted to be adjusted vertically by means of nuts 23 on the standards 12. This adjustment, as will be seen from the drawings, will serve to fully regulate the distance between the plungers 14 and 15 when they are in the nearest position with respect to each other in the mold. The shaft 22 may be operated by any desired means, that shown consisting of a gear 24, meshing with a worm 25, which is operated from a pulley 26 by means of a belt of the ordinary kind. The slide 19 is guided with respect to the standards 12 by means of guides 27. 28 is a second cam fixed to the shaft 22 and controlling the operation of a roller 29, journaled in the upper end of a vertically-reciprocating rod 30, which is adjustable by means of a nut 31 and is pivoted at its lower end to a lever 32, which in turn is pivoted to the standard at the point 33 and carries at its lower end a roller 34. This roller is adapted to engage with and operate a plate 35, attached to rods 36, and normally pressed downwardly by means of springs 37. The base 11 is perforated at 38 for the purpose of permitting the rods 36 to pass through it and for guiding the same. 39 is a third cam fixed to the shaft 22 and is preferably constructed in the form of a groove on each side of the cam 21.

40 is a roller or pin attached to the end of a lever 41, which is pivoted at 42 to a bracket 43, mounted upon one of the guides 27. The lower end of the lever 41 is pivoted to a link 44, which is adjustable, as shown at 45, for the purpose of increasing or decreasing its length and is adapted to engage with the feed-box 18 and reciprocate it on the plate 46, which is attached to the mold-plate 13. The plate 46 has guides 47 at each side for the feed-box. The rear end of the feed-box is provided with a projection 48, which, as shown in Fig. 7, is designed to close the bottom of the feed-hopper 49 when the feed-box is projected away from it.

50 represents the upper part of the hopper, which is preferably provided with a slot for the purpose of permitting the lever 41 to pass through it.

51 and $51^a$ represent a pair of wiping-rollers which are journaled upon the frame at the front part of the feed-box 18 and to which are secured at the ends a pair of pinions or small gears 52 and $52^a$. The upper part of the guide 47 upon one side is provided with a rack 53, with which the pinion $52^a$ engages. The pinion 52 also engaging with the pinion $52^a$ it will be obvious that upon the reciprocation of the feed-box along the guides 47 the two rollers 51 and $51^a$ will be caused to rotate upon their axes. 54 is another pinion, also engaging with the rack 53 and mounted upon the end of a shaft carrying an agitator or mixing device 55, located in the feed-box 18. The reciprocation of the feed-box will also obviously rotate the agitating device.

56 represents a device of any desired character for the purpose of dropping oil or other lubricant upon the roller 51, which will in turn apply it to the roller $51^a$. The purpose of this arrangement is to cause the rollers to act not only as wiping devices, but as oiling devices for the plungers. The base 11 is provided with springs 57 for the purpose of taking any extra strain from the standards 12 which would occur if any hard substance should get into the molds between the plungers.

58 is a pivoted lever with one end attached to the upper part of the slide 19 and provided with an adjustable weight 59 for the purpose of keeping the slide 19 in a raised position except when operated upon by the cam 21.

The details of our invention as represented in the drawings having been described, the operation of the device will now be explained.

Referring to Fig. 3, it will be seen that when the shaft 22 is in such a position that the cams will take the position shown in that figure the moving parts of the machine will be substantially in the positions shown in Fig. 5 and the rollers 20, 29, and 40 will be as indicated in Fig. 3. Upon the rotation of the shaft in the direction of the arrow, the first effect will be to force the roller 20 downwardly until the point $b$ is reached, the effect of this motion being to force the plunger 14 downwardly into the mold nearly as far as it is necessary for it to go in order to compress the material therein. During this time the roller 29 and the roller 40, being upon the circular parts of their respective cams, will remain stationary, and the plunger 15 and feed-box 18 will also remain stationary. From the point $b$ to the point $c$ the roller 20 will be allowed to be pulled upwardly to a slight extent by the weight 59 and the roller 29 will be forced downwardly by a projection $d$ on the cam 28. The effect of this operation will be to force the air to escape from the partly-compressed mass of plastic material, which is an object attained in hand-presses by manual manipulation. The roller 40 will still remain upon the circular part of its cam, and therefore the feed-box 18 will not move during this period. The shape of the two cams 21 and 28 between the points $b$ and $c$ is such as to bring both rollers 20 and 29 back to their original positions, so that they are in the same place at the points $b$ and $c$. Accordingly the plungers 14 and 15, which have both been raised, but in different degrees and on different curves, will be brought back to their original positions. Upon the rotation of the shaft from the point $c$ to the point $e$ the roller 20 will be forced farther downward, taking with it the plunger 14, and the roller 29 will remain stationary, as will the plunger 15, the obvious effect of which will be to compress the material between the plungers to the extent desired. At this point the compression of the material in the mold is completed, and the further operation of the cams is for the purpose of removing said material from the mold and placing the plungers in position for receiving a new charge. The cam 28 may be circular between $c$ and $e$, if desired, the plunger 15 being stationary. From the point $e$ to the point $f$ the roller 29 will be forced farther down on account of the shape of the cam at this point, and it is to be undeastood that the cam-surface from $f$ to $h$ is sufficiently high not only to force the plunger 15 to the top of the mold, but to project its upper surface a small distance—for example, a sixteenth of an inch—above the top of the guide-plate 46. Previous to this the cam-surface $e$ to $g$ upon the cam 21 is of such a character as to have permitted the weight 59 to pull the plunger 14 entirely out of the mold. The remainder of the surface of the cam 21 from the point $g$ to the point $m$ and around to the point $o$ is perfectly circular, so that the plunger 14 remains at the top of its stroke during all this period. When the shaft is rotated to the point $h$, the roller 29 is permitted to be forced toward the center of the shaft a short distance, preferably the same distance that the plunger 15 projects above the top of the plate 46, allowing for the leverage of the connections between the cam and plunger. When the cam 28 reaches the point $l$, the roller 29 drops to the point $m$ and depresses the plunger 15 to the bottom of the mold or to its original position, which it retains until the shaft again rotates to the point $b$. After the shaft passes the point $k$ the cam-grooves 39 are of such shape as to force the roller 40 outwardly from the center, and consequently force the feed-box toward the mold, and when the shaft reaches the point $n$ the feed-box will have reached the position shown in Fig. 7, the reverse operation taking place from $n$ to $p$.

When the feed-box moves forward, it will be obvious that the rollers 51 and $51^a$ will be rotated by means of the pinions 52 and $52^a$ and the rack 53, as above described, and that oil being supplied to them by means of the oil-dropping device 56 the faces of the plungers 14 and 15, the latter being raised above the surface of the plate 46, will be wiped and oiled and also that the agitating device 55 will be caused to rotate and insure the deposition of the plastic material into the mold when the feed-box reaches its innermost position. The operation of the plungers and feed-box is such that the top of the plunger 15 will be even with the top of the plate 46 when the feed-box is projected over it, and as the plunger is withdrawn while the feed-box is in that position and while it is receding the material will not drop into the mold, and thereby entrap air, but will be sucked into the mold even if it is not forced in by gravity or by the operation of the agitating device 55. This is a very important point, because it prevents the introduction of a large amount of air, which is always present in certain other forms of molding-machines.

It is to be observed that the cam-grooves 39 are set at about ninety degrees from the cams 21 and 28 on account of the roller 40 being placed at one side of the cam instead of at the bottom, where the rollers 20 and 29 are located. It will be obvious that the cams may be set in any desired position and that the exact shape thereof may be departed from in many particulars without changing our invention, also that many other modifications may be made without departing from the spirit thereof.

Having thus described our invention, we claim as new and desire to secure by Letters Patent—

1. A molding-press comprising a mold, two plungers, one of said plungers adapted to enter the mold from each end, means for forcing one plunger into the mold, means for thereafter slightly retracting said plunger while it remains in the mold, means for simultaneously moving the other plunger forward in the mold, means for then forcing said plungers back toward the opposite ends of the mold, and means for finally withdrawing said first-mentioned plunger.

2. A molding-press comprising a mold, a plunger adapted to enter the mold from above, a plunger adapted to enter the mold from below, means for forcing the upper plunger into the mold to compress the plastic material, means for slightly retracting the upper plunger while it remains in the mold for permitting air to escape from the plastic material, means for simultaneously moving the lower plunger upwardly, means for then forcing said upper plunger back toward the lower plunger to complete the compression of the material, and means for finally withdrawing said upper plunger.

3. A molding-press comprising a mold, two plungers, one of said plungers adapted to enter the mold from each end, means for forcing one plunger into the mold, means for slightly retracting said plunger in the mold, means for simultaneously moving the second plunger forward slightly in the mold, means for then simultaneously moving both plungers in reverse directions, means for withdrawing one plunger from the mold, and means for simultaneously moving the other plunger through the mold and beyond the opposite face thereof.

4. A molding-press comprising a mold, an upper plunger and a lower plunger, means for forcing the upper plunger into the mold, means for slightly raising said plunger in the mold, means for slightly raising the lower plunger in the mold, means for then simultaneously lowering both plungers, means for withdrawing the upper plunger, and means for simultaneously raising the lower plunger to a point above the upper face of the mold.

5. A molding-press comprising a mold, a plunger adapted to enter the mold, means for holding said plunger temporarily in a stationary position, means for then moving said plunger slightly in the mold, means for retracting said plunger, and means for finally moving said plunger through the mold until its end projects beyond the opposite face of the mold.

6. A molding-press comprising a stationary mold, a plunger adapted to enter the lower end thereof, means for holding said plunger temporarily in a stationary position, means for then raising said plunger in a slight degree in the mold, means for retracting said plunger, and means for finally moving said plunger through the mold and projecting the upper end thereof beyond the upper face of the mold.

7. A molding-press comprising a mold, a pair of plungers, a main shaft, two cams on said shaft, and connections from said cams to said plungers for simultaneously forcing one plunger into the mold and holding the other stationary, and then simultaneously slightly retracting the first plunger and forcing the other one toward it.

8. A molding-press, comprising a mold, two plungers coacting therewith, a shaft, a cam on the shaft, and connections from said cam to said plungers for forcing one of the plungers into the mold, then simultaneously retracting said plunger and forcing the other one toward it, then forcing the first-mentioned plunger back, and finally withdrawing it from the mold.

9. A molding-press comprising a mold, two plungers coacting therewith, a shaft, two cams on said shaft, and connections from said cams to said shaft for simultaneously forcing one plunger down into the mold, slightly retracting it, forcing it downward again, and finally withdrawing it and holding the other plunger stationary, raising it, lowering it, and finally raising it to the top of the mold.

10. A molding-press comprising a mold, a plunger adapted to enter the bottom thereof, a cam, an adjustable rod operatively connected to said cam, and connections from said rod to said plunger for forcing the plunger upwardly in the mold, retracting it, and finally forcing it through the mold to the upper end thereof.

11. A molding-press comprising a mold, a plunger adapted to enter the mold, a cam, a rod operatively connected to said cam and reciprocable thereby, a lever pivoted to said rod, a plunger-plate supporting said plunger, and a resilient connection between said lever and said plunger-plate.

12. A molding-press comprising a mold, a pair of plungers, a feed-box, an agitator in said feed-box, means for reciprocating said plungers, means for reciprocating said feed-box, and means for transmitting motion from said feed-box to said agitator to rotate said agitator.

13. A molding-press comprising a mold, a plunger, a feed-box, wiping-rollers, means for reciprocating said plunger, means for reciprocating said feed-box, and means for rotating said rollers.

14. A molding-press comprising a mold, a pair of plungers, a feed-box, a pair of rollers mounted upon said feed-box, means for reciprocating said feed-box, means for rotating said rollers, and means for holding said plungers in position to be touched by the surfaces of said rollers in their reciprocation.

15. In a molding-press, the combination of a mold, a movable plunger therefor, means for withdrawing the plunger from the mold, a rotary wiper, means for moving the wiper across the face of the plunger, and means for simultaneously rotating the wiper.

16. In a molding-press, the combination of a mold, a plurality of plungers therefor, means for withdrawing one of the plungers from the mold, means for moving the other plunger through the mold and beyond the face thereof, a pair of rotary wipers, means for moving the wipers across the faces of said two plungers, and means for simultaneously rotating the wipers.

17. In a molding-press, the combination of a mold, a movable plunger therefor, a feed-box for plastic material, means for withdrawing the plunger from the mold, means for moving the feed-box over the face of the mold, a rotary wiper mounted upon the feed-box, and means for rotating the wiper.

18. In a molding-press, the combination of a mold, a pair of plungers therefor, a cam for withdrawing one of the plungers from the mold, a cam for forcing the other plunger through the mold and beyond the face thereof and for holding said plungers in these positions, a pair of rotary wipers, means for moving the wipers across the faces of the plungers, a stationary rack, and a gear secured to one of said wipers and meshing with said rack.

19. In a molding-press, the combination of a mold, a feed-hopper, a feed-box, means for moving the feed-box across the face of the mold, and a rotary agitating device in said feed-box adapted to be rotated by the movement of the feed-box.

20. In a molding-press, the combination of a mold, a feed-hopper, a feed-box, means for moving said feed-box across the face of the mold, an agitating device mounted in said feed-box, a stationary rack, and a gear fixed to said agitating device and meshing with said rack.

21. In a molding-press, the combination of a mold, a plunger therefor, a rotary wiper, means for moving the wiper across the face of the plunger, means for simultaneously rotating the wiper, and means for supplying oil to the wiper.

22. In a molding-press, the combination of a mold, a pair of plungers therefor, means for withdrawing one of said plungers from the mold, means for forcing the other plunger through the mold and beyond the face thereof, a pair of rotary wipers, means for moving said wipers across the faces of said plungers, means for simultaneously rotating said wipers, and means for supplying oil to said wipers, whereby the wipers supply the surfaces of the plungers with oil.

In testimony whereof we have signed our names to this specification in the presence of two subscribing witnesses.

CHARLES HENRY DARLING.
HARRY RHEAD.

Witnesses:
ELLERY ROBBINS,
EDWARD R. ROBBINS.